Aug. 15, 1939.     V. G. BIRO     2,169,517
MEAT SAWING MACHINE
Filed May 8, 1939     2 Sheets-Sheet 1

Inventor
Vincent G. Biro
By
Attorney

Aug. 15, 1939. V. G. BIRO 2,169,517
MEAT SAWING MACHINE
Filed May 8, 1939 2 Sheets-Sheet 2

Inventor
Vincent G. Biro

Patented Aug. 15, 1939

2,169,517

UNITED STATES PATENT OFFICE 2,169,517

MEAT SAWING MACHINE

Vincent G. Biro, Marblehead, Ohio

Application May 8, 1939, Serial No. 272,433

2 Claims. (Cl. 146—88)

My invention has for its object to produce an efficient regulator plate for regulating the thickness of meat slices produced by meat sawing machines. The invention provides a meat regulator plate that may be accurately and quickly adjusted with reference to the saw blade of the machine and, also, may be readily swung about a part of the adjusting mechanism to above the bed of the machine to regulate the thickness of the slices, if desired, and away from the bed of the machine to enable location of an animal carcass, or a large part thereof, on the bed for cutting such large parts or to readily slide the plate to an estimated point for producing cuts of meat having an estimated weight.

The invention may be contained in meat slicing machines of different forms and, to illustrate a practical application of the invention, I have selected a machine having a meat slice regulating blade embodying my invention. The meat-slicing blade, and a part of a machine to which it may be applied, is shown in the accompanying drawings.

Figure 1:
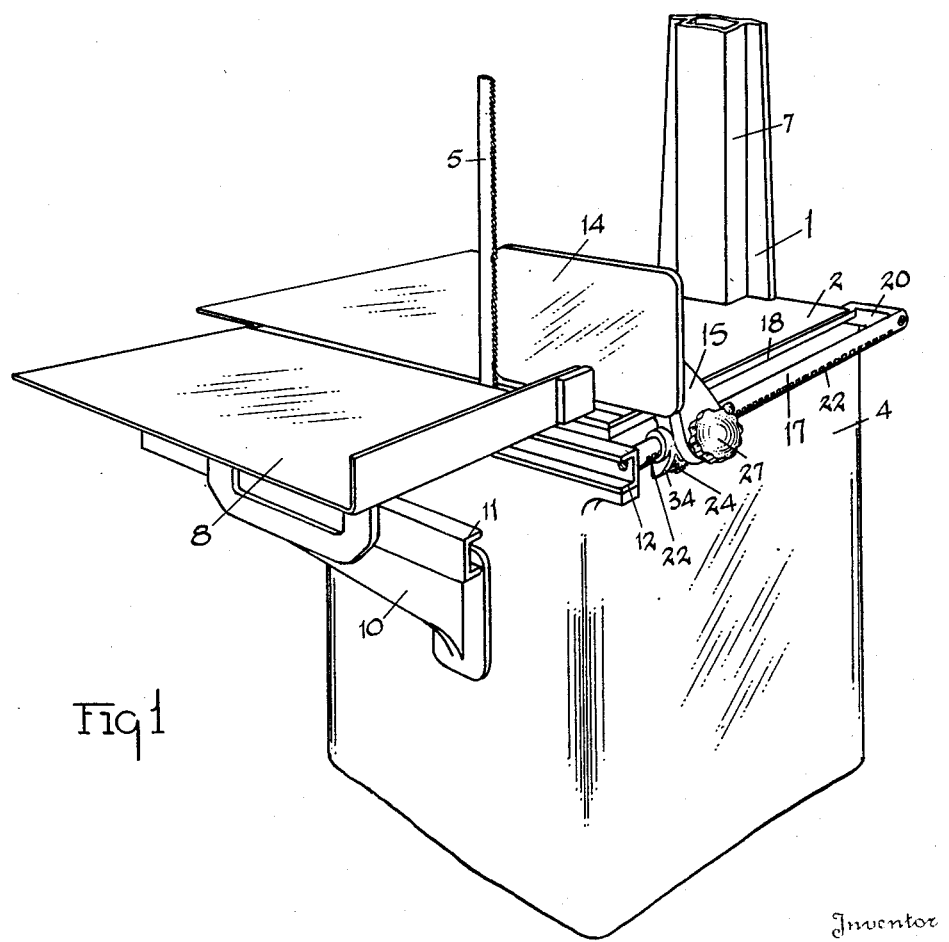
Figure 2:
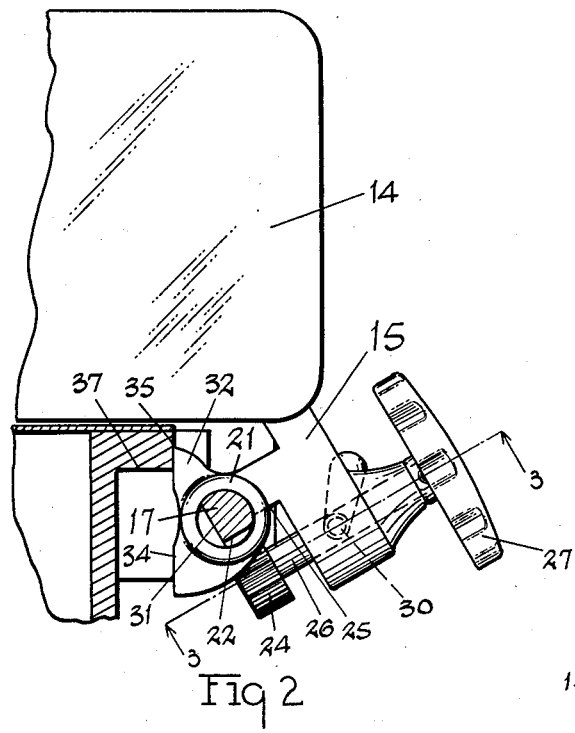
Figure 3:
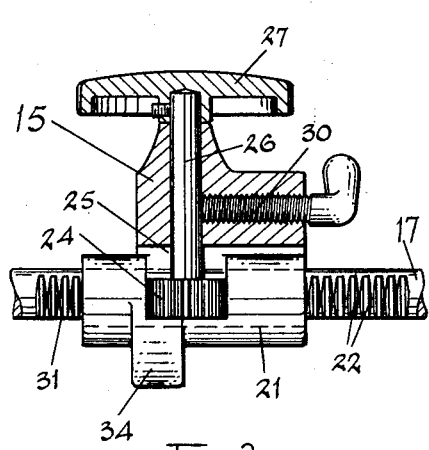
Figure 4:
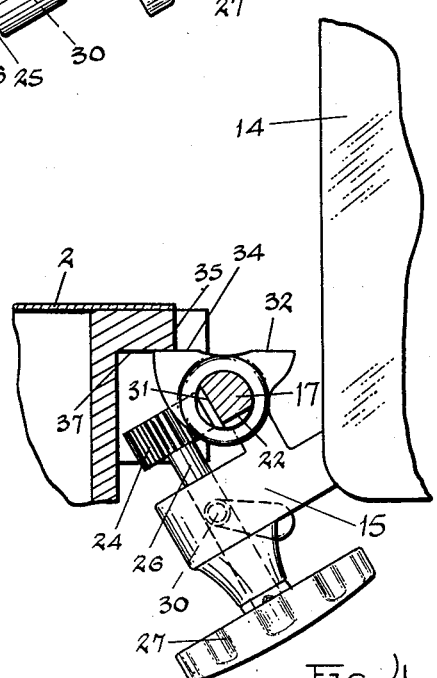

Fig. 1 of the drawings illustrates a perspective view of the part of the machine to which the plate is connected. Fig. 2 illustrates a means for supporting the plate, with reference to the machine, and for adjusting the plate, with reference to the bed of the machine. Fig. 3 illustrates a view of a section of a part of the adjusting means taken on the plane of the line 3—3 indicated in Fig. 2. Fig. 4 illustrates the plate supported in a position different from that in which it is shown supported in Fig. 2.

The meat sawing machine 1, shown in Fig. 1, has a bed 2 that is located on the top of the base 4. A band saw 5 is mounted on a pair of wheels, one of which is rotatably supported on a pedestal 7 and the other of which is located in the base 4. A suitable driving mechanism, such as an electric motor and reducing gear, located in the base 4, operates the lower wheel to drive the saw 5 in a manner well known in the art.

Contiguous to one end of the bed 2, there is located a sliding plate 8, which may be mounted on the side of the base 4 and on a bracket 10 that protrudes from the base 4. As is common in the art, the plate 8 is provided with suitable rollers or wheels that move along channels 11 and 12, the channel 11 being mounted on the bracket 10 and the channel 12 being mounted on the side of the base 4. When slicing, the meat is placed upon the plate 8 and is moved rearward with respect to the machine and against the saw 5.

To regulate the thickness of the slices, a slice-regulating plate 14 is supported, to overhang the bed 2 of the machine, by means of a bracket arm 15, which is supported by slidable and pivotal movements on a bar 17, that is secured to the base 4 of the machine. The bed 2 protrudes forward and above the front of the base 4 to form the ledge 18 and the bar 17 is located below the ledge and extends parallel therewith. In the form of construction shown in the drawings, the bar 17 is secured, at one end, to the base 4, by means of the bracket 20 and, at the other end, to the channel 12 to dispose the bar 17 in spaced relation with respect to the upper end of the base 4 and in parallel relation to the ledge 18. The bar 17 is cylindrical in form and the bracket 15 has a lateral protruding boss 21 that is bored to slidably fit the bar 17 and form a sleeve of considerable length that is rotatably and slidably movable along the bar for securely holding the guiding surface of the plate 14 parallel to the direction of movement of the plate 8.

The bar 17 is provided with teeth 22. The bracket arm 15 is provided with a pinion 24 that is disposed in a recess 25 formed in the boss 21 and in position to engage the teeth 22 of the bar 17 when the meat-slicing regulator plate is located in such a position that it overhangs the bed of the machine, as shown in Figs. 1 and 2. The pinion 24 is rotatably supported in the boss 21 by means of a shaft or pin 26, and a handle 27 is connected to the pin 26 for rotating the pinion 24 to move the bracket and the plate along the bar 17. The handle 27, is thus, conveniently located, with reference to the operator, when slicing the meat. Consequently, the plate may be adjusted, with reference to the saw 5, to produce desired thickness of the slice as the meat is carried by the plate 8 along the surface of the plate 14 and against the saw 5.

The bracket arm 15 is, also, provided with a locking screw which extends into one end of the bracket arm to engage the pin 26 and releasably secure the pin 26 when the bracket has been shifted along the bar 17 to the desired position, with reference to the saw 5 by the operation of the handle. Thus, when a number of slices, having substantially the same thickness, are to be cut, the locking screw may be turned to clamp the pin 26 and, thus, secure the plate 14 in a fixed position during the sawing operations of the machine.

The bar 17 is provided with a plane surface 31 that is located contiguous and substantially at right angles to the bottoms of the valleys between the teeth 22 to enable rotation of the bracket arm and the plate 14 about the bar 17 or, more particularly, to enable the teeth of the pinion 24 to slide from the teeth 22 of the bar 17 and move to a position to overhang the surface 31, and in spaced relation thereto. This occurs when the bracket arm 15 is disposed in the position shown in Fig. 4 and the plate 14 is disposed remote from the bed 2 of the machine. The bracket arm 15 and the plate 14 may then be manually slid along the bar 17 without rotation of the pinion 24.

In order to support the plate 14 in the position where it overhangs the bed 2 and, also, to support the plate 14 in the position remote from the bed, the bracket arm is provided with a pair of stops 32 and 34, which engage the ledge 18. The stop 32, in the particular machine shown, engages the vertical side 35 of the ledge when the plate 14 is supported above the bed 2, in the position shown in Fig. 2, and the stop 34 engages the horizontal side 37 of the ledge when the plate 14 is swung away from the bed 2 of the machine and is disposed in the position shown in Fig. 4. The stops 32 and 34 are readily slidable along the ledge when in engagement therewith.

The construction, thus, affords a means whereby the plate 14 may be readily manipulated with reference to the bed 2 of the machine to enable ready manipulation of the machine to cut slices of meat or to cut different sizes of meat, or to cut from a carcass.

I claim:

1. In a meat-sawing machine, a machine bed; a bar secured to the bed and having gear teeth; a meat-guide plate; a bracket member connected to the plate for supporting the plate for pivotal and slidable movements on the bar and having a pinion rotatably supported in the bracket and adapted to engage the teeth of the bar; a handle connected to the pinion for rotating the pinion to adjustably move the plate relative to the machine bed; the bar having a plane surface contiguous to the ends of the teeth of the bar to enable rotation of the pinion, the bracket and the plate.

2. In a meat-sawing machine, a machine bed having a ledge; a bar secured to the bed and extending substantially parallel to and below the ledge and having gear teeth; a meat-guide plate; a bracket member connected to the plate for supporting the plate for pivotal and slidable movements on the bar and having a pinion rotatably supported in the bracket and adapted to engage the teeth of the bar; a handle connected to the pinion for rotating the pinion to adjustably move the plate relative to the machine bed; the bar having a plane surface contiguous to the ends of the teeth to enable rotation of the pinion, the bracket and the plate; a pair of stops located on the bracket for engaging the ledge when the bracket is rotated on the bar and coacting with the bar for slidably supporting the plate in position overhanging the bed and in position removed from the bed.

VINCENT G. BIRO.